(12) United States Patent
Trunk

(10) Patent No.: US 11,299,271 B2
(45) Date of Patent: Apr. 12, 2022

(54) AUTOMATIC ANNOUNCEMENT IN A PASSENGER AIRCRAFT

(71) Applicant: Diehl Aerospace GmbH, Ueberlingen (DE)

(72) Inventor: Lothar Trunk, Weibersbrunn (DE)

(73) Assignee: Diehl Aerospace GmbH, Ueberlingen (DE)

( * ) Notice: Subject to any disclaimer, the term of this patent is extended or adjusted under 35 U.S.C. 154(b) by 79 days.

(21) Appl. No.: 16/877,611

(22) Filed: May 19, 2020

(65) Prior Publication Data

US 2020/0369386 A1 Nov. 26, 2020

(30) Foreign Application Priority Data

May 21, 2019 (DE) .......................... 102019003553.4

(51) Int. Cl.
*B64D 11/00* (2006.01)
(52) U.S. Cl.
CPC ................................ *B64D 11/0015* (2013.01)
(58) Field of Classification Search
CPC ............... G08G 5/0021; G08G 5/0095; B64D 11/0015; H04B 7/18506
See application file for complete search history.

(56) References Cited

U.S. PATENT DOCUMENTS

| 3,641,496 A | 2/1972 | Slavin |
| 4,093,938 A | 6/1978 | Argentiari et al. |
| 6,335,694 B1 * | 1/2002 | Beksa ................... G08G 5/0021 340/945 |
| 2009/0015437 A1 * | 1/2009 | Campagne ........... G08G 5/0078 340/945 |
| 2018/0086465 A1 * | 3/2018 | Klose ................. B64D 11/0015 |

FOREIGN PATENT DOCUMENTS

| DE | 2 030 987 A1 | 1/1971 |
| EP | 0 620 697 A1 | 10/1994 |

* cited by examiner

*Primary Examiner* — Omeed Alizada
(74) *Attorney, Agent, or Firm* — Scully Scott Murphy and Presser

(57) ABSTRACT

An announcement device or a passenger aircraft contains a memory or announcements with assigned potential flight phases and a control and evaluation unit with inputs for input signals with information relating to flight phases of the passenger aircraft, an output for the announcements, wherein the control and evaluation unit is configured to determine a current flight phase on the basis of the input signals, to check whether an announcement for the current flight phase is present in the memory, and to output this announcement as the current announcement at the output.

A passenger aircraft contains the announcement device.

In a method for outputting an announcement, announcements and input signals are provided, a current flight phase is automatically determined from the said input signals and a possibly present associated current announcement is output.

A cabin management system of a passenger aircraft is used as an announcement device and/or to carry out the method.

12 Claims, 1 Drawing Sheet

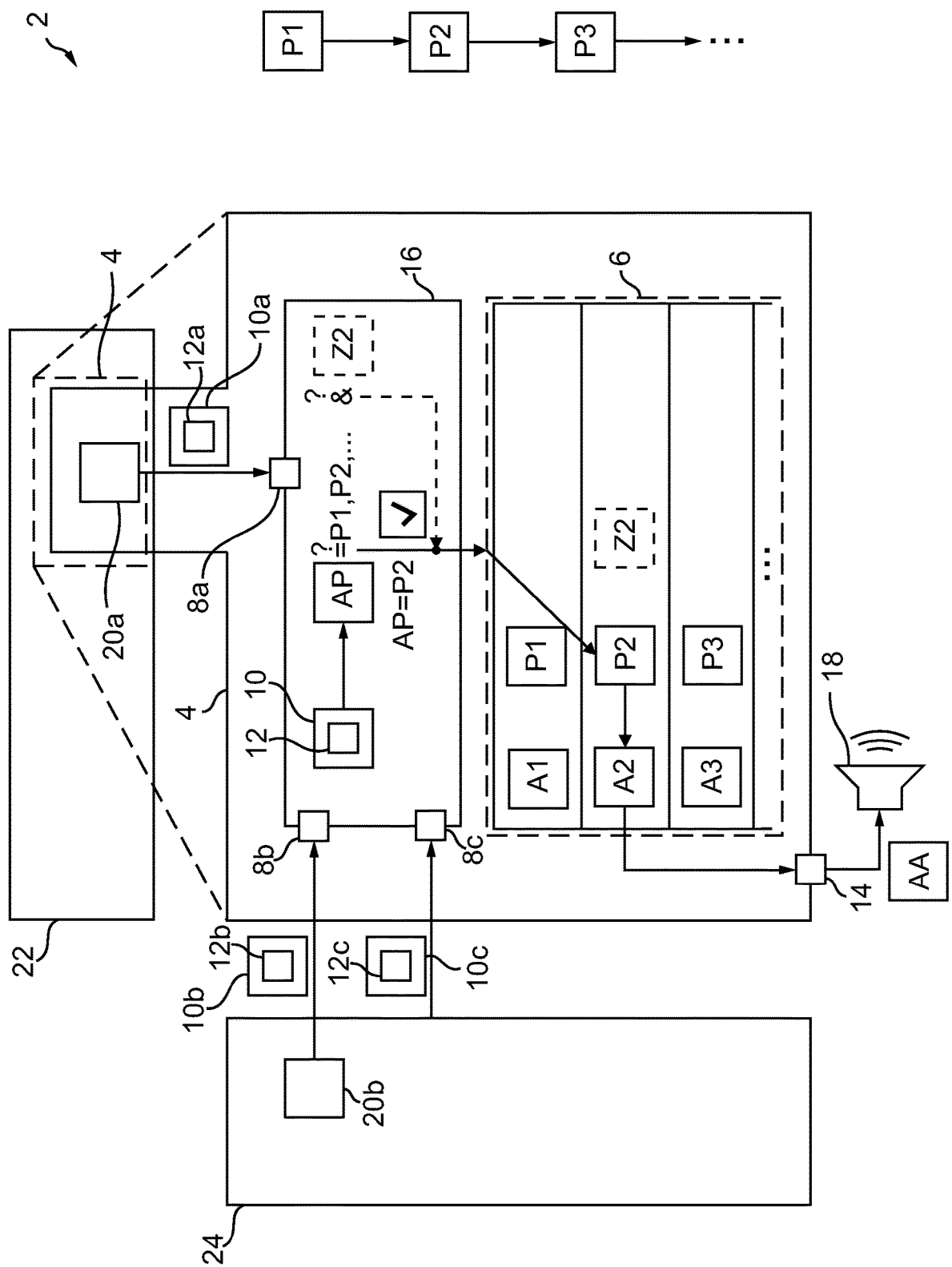

AUTOMATIC ANNOUNCEMENT IN A PASSENGER AIRCRAFT

BACKGROUND OF THE INVENTION

The invention relates to an announcement device for a passenger aircraft, a passenger aircraft, a method for outputting an announcement in a passenger aircraft and the use of a cabin management system (CMS) for announcements.

DISCUSSION OF THE PRIOR ART

Announcements of this type in passenger aircraft serve to transmit spoken information from the flight crew or cabin crew to passengers. Announcements are e.g. "Please take your seats", "Please switch off your personal electronic devices" or "We have reached our destination airport, please remain seated and keep your seat belts fastened".

It is known from practice that announcements are performed aurally (relating to the ears/hearing) by a member of the cabin crew or pre-recorded announcements are triggered via multiple inputs on the cabin management system.

SUMMARY OF THE INVENTION

The present invention is directed to improvements with regard to announcements in passenger aircraft.

More particularly, the present invention is directed to an announcement device for a passenger aircraft which passes through different flight phases during a flight. Flight phases may be, for example: boarding, leaving the departure gate, taxiing, taking off, cruising altitude reached, seat belt signs on/off, leaving cruising altitude, landing approach, landed, taxiing, at the gate, turbulence, touch-and-go landing, etc. Some flight phases can occur once or multiple times during a flight. Some flight phases occur during every flight, others only possibly.

The announcement device contains a memory. At least one announcement for the passenger aircraft is storable in the memory or a corresponding announcement is stored in the memory. The announcement is, in particular, a sound recording which is stored in digital or analogue form. At least one potential flight phase is assigned to each of the announcements. This is, in particular, similarly stored in the memory. The announcement is intended to be output during this flight phase, so that the passages in the aircraft can hear this announcement.

The announcement device contains a control and evaluation unit. The control and evaluation unit contains at least one input. Each of the inputs serves to feed a respective input signal into the control and evaluation unit. During the operation of the aircraft, this input signal contains information which is correlated with at least one flight phase of the passenger aircraft. It can therefore be inferred whether a corresponding flight phase is or is not currently occurring by analysing or evaluating the input signal or information.

The announcement device contains an output for outputting the announcements, so that an output announcement can be transmitted to the passengers or can be played back to them and they can hear the announcement.

The control and evaluation unit is configured and designed, e.g. through hardwiring or programming, for the following purpose: a current flight phase is determined on the basis of the input signals, or an attempt is made to determine such a flight phase, i.e. the corresponding determination steps are carried out. It is therefore established whether and which known flight phase is occurring or whether no known flight phase is occurring or no such flight phase can be determined. A result of the assessment can therefore also be that no known flight phase could be determined. In particular, the input signals are monitored continuously in order to be able to identify, in particular, changes of flight phases (start, end) promptly or in real time.

In the case where a current flight phase, in particular the start or end thereof, has been determined, a check is carried out to ascertain whether the memory contains an announcement whose assigned potential flight phase corresponds to the current flight phase. This determined announcement in the memory is then considered or identified as the "current announcement". In the case of a correspondence of this type (matching current/potential flight phase in the memory), the current announcement is output, in particular automatically, at the output. The output takes place, in particular, at the time of the (identified) start or end of the flight phase. Delays due to processing times, timing of queries, etc., are intended to be ignored here. The announcement is forwarded from the output e.g. into an audio system of the aircraft, so that said announcement is output, e.g. via the on-board loudspeakers, headphone sockets, an entertainment system of the aircraft, etc.

The announcement device can be present as a concentrated device, but can also be divided among a plurality of components in the aircraft as a distributed system.

The invention is based on the observation that, in known practice, the necessary announcements of the cabin crew do not take place automatically. Recorded announcements can only be played back manually. Particularly on short-haul flights, one member of the cabin crew is occupied mainly with making announcements. As a result, the remaining cabin crew members have a significantly increased workload, or in some instances it may not be possible to serve all passengers.

The invention is based on the notion of offering a facility to release cabin crew from routine tasks so they can concentrate more on the passengers.

According to the invention, the evaluation of the input signals (in particular the combination of aircraft information with sensor data, see below) allows an automatic triggering of the recorded announcements.

According to the invention, automatic flight-phase-dependent announcements, in particular, are implemented in the aircraft cabin.

In one preferred embodiment, an additional criterion is assigned to at least one of the announcements which is stored in the memory. The additional criterion is assigned to at least one of the potential flight phases which is in turn assigned to the announcement. The control and evaluation unit is then further configured to output the announcement in the event of correspondence (determined/potential flight phase match) only if the additional criterion is additionally satisfied.

The corresponding announcement is therefore not necessarily output if the potential flight phase actually occurs, but only if an additional condition (additional criterion) is satisfied. A specific descent rate, for example, could be assigned to the "Descent" flight phase, and the "Please fasten seat belts" announcement could be output if said descent rate were exceeded. Specific flight phases, in particular, can therefore be divided into flight sub-phases in terms of the announcements. The additional criterion is, in particular, also storable or stored in the memory.

In one preferred variant of this embodiment, the additional criterion contains a time criterion, and the control and evaluation unit is configured to output the announcement in the event of correspondence at a time which is defined by the time criterion. Corresponding time criteria may, for example, be: "at the start", "5 minutes after the start", "at the end" of the flight phase, etc.

In one preferred embodiment, the input signal contains or is this signal from a sensor. Sensors are particularly suitable for generating input signals which contain information from which specific flight phases can be inferred. Wheel sensors, for example, can indicate that the aircraft is stationary (flight phase: parking position reached), pressure/altitude sensors can indicated that a specific flight altitude has been reached (flight phase: cruising altitude reached), etc.

In one preferred variant of this embodiment, the sensor is a motion sensor and/or pressure sensor and/or a passenger aircraft avionic system sensor. "Avionic system" is understood here to mean the entirety of all devices for controlling the aircraft, i.e., inter alia, the entire sensor system or actuator system, and also data generated internally within the aircraft (e.g. by flight computers) as well as received external data (e.g. GPS data, weather data, radio signals, etc.). The avionic system therefore also includes the entirety of all raw and processed signals and data in the aircraft. Sensors of this type supply aircraft information/flight information in the form of sensor data which are then incorporated into or form the input signals. The sensor may be an existing part of the aircraft, since it performs specific sensor system tasks in the aircraft which are unrelated to the flight phase detection. According to the invention, a synergistic dual use of the sensor then also takes place due to the announcement device. However, the sensor can also be specifically added to the aircraft for the announcement device.

Through the use of information of this type, it is possible to define and recognize virtually any and all potential flight phases.

In one preferred variant of this embodiment, the announcement device contains at least one of the sensors. The sensor is then part of the announcement device, particularly if it is provided specifically and exclusively for this announcement device only.

In one preferred variant of this embodiment, the passenger aircraft contains a cabin Management system (CMS) and at least one of the sensors is designed as a sensor of the CMS. A corresponding sensor may already be present in any case in the CMS and may be provided there for other tasks, and can now be used for the announcement device also or can be incorporated into and/or provided in the CMS specifically for the announcement device.

In one preferred embodiment, the input signal contains a signal of the passenger aircraft avionic system. Virtually all conceivable flight phases of an aircraft are known from the avionic system as explained above or said flight phases can be determined from the avionic system on the basis of criteria/analyses/queries, etc. Corresponding criteria, etc., merely have to be implemented and applied in the control and evaluation unit for this purpose. From the avionic system, at least or at most those input signals in particular which are necessary and sufficient for identifying the flight phases (if necessary taking account of redundancies for more reliable identification of the flight phases) are used for the announcement device.

Conversely, only announcements relating in particular to those flight phases which are derivable from the input signals, here, in particular, of the avionic system, etc., are stored in the memory.

In one preferred embodiment, the passenger aircraft contains a CMS. A part of the announcement device is designed as a submodule for or of the CMS. In particular, the announcement device is therefore partially or totally integrated into the CMS. Resources of the CMS can thus be shared, in particular, by the announcement device. Resources are, for example, processors or their processing capacity, program and data memories, input signals or corresponding interfaces, existing data, sensors, etc.

The present invention is also directed to a passenger aircraft with an announcement device according to the invention. The aircraft and at least some of its embodiments and the respective advantages have already been explained accordingly in connection with the announcement device according to the invention.

In particular, the passenger aircraft contains one or more of the aforementioned necessarily or optionally provided components of the announcement device and/or the other aforementioned components: in particular the input signals and/or the sensors and/or the avionic system and/or the CMS.

The present invention is further directed to a method for outputting an announcement in a passenger aircraft, wherein the passenger aircraft passes through different flight phases during a flight. In the method, at least one announcement is provided for the passenger aircraft, wherein at least one potential flight phase is assigned to each of the announcements for the output thereof. At least one input signal is provided which contains information which is correlated with at least one flight phase of the passenger aircraft. A current flight phase is automatically determined on the basis of the input signals. In the event that a current flight phase is determined, a check is automatically carried out to ascertain whether an announcement is or has been provided, the potential flight phase of which corresponds to the current flight phase, and this announcement is identified as the current announcement. In the event of a match, the current announcement is output, in particular automatically, in the passenger aircraft.

The method and at least some of its embodiments and the respective advantages have already been explained accordingly in connection with the announcement device according to the invention or the passenger aircraft according to the invention.

In one preferred embodiment, the method is carried out by means of an announcement device according to the invention and/or in a passenger aircraft according to the invention. In particular, the steps designated above as "automatic" are thereby implemented.

Still further, the present invention is directed to a use of a CMS of a passenger aircraft as at least part of an announcement device according to the invention and/or to carry out at least a part of the method according to the invention.

The announcement device according to the invention or a functionality according to the method is partially or totally implemented accordingly in a CMS and/or forms a part of the CMS.

The invention is based on the following realizations, observations or considerations and also comprises the following embodiments. The embodiments are also referred to partly for simplification as "the invention". Here, the embodiments may also contain parts or combinations of the aforementioned embodiments or may correspond thereto and/or may possibly also include hitherto unmentioned embodiments.

According to the present invention, recorded announcements are automatically triggered by means of the flight phase information (in particular information in the input signal) and/or by, in particular, motion and pressure sensors (in particular their information). The invention is based on the realization that virtually all (in particular standard) announcements can be assigned to dedicated flight phases (examples of which have been indicated above). The different flight phases are known to the avionic system (or sufficient information is available there in order to be able to identify the flight phases) and can be forwarded to the announcement device, in particular the cabin management system. Alternatively and/or additionally, it is possible, for example, to determine this flight phase autonomously via acceleration sensors, pressure sensors or position sensors integrated into the CMS.

These automatic announcements enable a substantial reduction in cabin crew workload. A heavy workload is imposed on cabin crew, particularly between the "cruising altitude reached" and "landing approach" flight phases due to the food and drink service, sale of goods, waste collection, checking the cabin and preparing the cabin for landing. A cabin crew member is freed up by the automatic announcements and can provide support for the aforementioned tasks. This results in reduced cabin crew workload and improved service to passengers.

BRIEF DESCRIPTION OF THE DRAWINGS

Further features, effects and advantages of the invention are set out in the following description of one preferred example embodiment of the invention, and also in the attached figures. In a schematic diagram:

FIG. 1 shows a system view of a passenger aircraft with an announcement device according to the invention.

DETAILED DESCRIPTION OF THE INVENTION

FIG. 1 shows a system view of a section from a passenger aircraft 2 (not shown in further detail). During operation, i.e. during a flight, the passenger aircraft 2 passes through different flight phases P1,2,3, . . . , of which only three are shown symbolically in FIG. 1: P1: boarding, P2: leaving the departure gate, P3: taxiing, etc.

The passenger aircraft 2 contains an announcement device 4. This contains a memory 6. A multiplicity of announcements A1,2,3, . . . , here in the form of audio files, are stored in the memory 6, only three of said audio files being shown by way of example in FIG. 1. A respective potential flight phase P1,2,3, . . . of the passenger aircraft 2 is assigned to each of the announcements A1,2,3, . . . and is similarly stored in the memory 6. The passenger aircraft 2 could potentially reach or pass through these potential flight phases P1,2,3, . . . In the respective flight phase P1,2,3, . . . , the correspondingly assigned announcement A1,2,3, . . . is output as the current announcement AA in the passenger aircraft 2 so that passengers can hear it.

The display device 4 contains a control and evaluation unit 16. This unit contains three inputs 8a-c. A respective input signal 10a-c is fed into the announcement device 4 at each of the inputs 8a-c. Each of the input signals 10a-c contains information 12a-c which is correlated (in a manner not shown in detail) with the flight phases P1,2,3, . . . of the passenger aircraft 2. In other words, the information 12a-c can be evaluated in such a way that one of the flight phases P1,2,3, . . . (if it is occurring at that time) can be determined as the current flight phase AP of the passenger aircraft 2. It can also be established, particularly in rare cases, that none of the (known or classified) flight phases P1,2,3, . . . is occurring at that time, since this phase has not previously been classified.

The display device 4 further contains an output 14 to output a respective announcement of the announcements A1,2,3, . . . as the current announcement AA.

The control and evaluation unit 16 is configured as follows through programming to carry out the following steps.

The respective current flight phase AP of the passenger aircraft 2, here the flight phase P2, since the aircraft is currently in this phase or currently reaches this phase, is determined on the basis of the input signals 10a-c by evaluating the information 12a-c contained therein. Since the flight phase P2 is assigned to the announcement A2, the announcement A2 is selected as the current announcement AA and is automatically output via the output 14 to the on-board loudspeakers 18 of the passenger aircraft 2. The announcement A2 states: "We will shortly be taking off. Please fasten your seatbelts".

In one variant of the example, an additional criterion Z2, here a time criterion, is also assigned to the announcement A2 in the memory 6. This criterion specifies that the announcement A2, if it has been identified as the current announcement AA because the assigned flight phase P2 is occurring, is to be output one minute after the start of the flight phase P2. The control and evaluation unit 16 is therefore configured to check or evaluate the additional criterion Z2 also when the flight phase P2 is detected. The control and evaluation unit 16 therefore waits for one minute after the flight phase P2 has been detected before the announcement A2 is output.

The input signals 10a-b are in each case signals from sensors 20a-b. The sensor 20a is a sensor of a CMS 22 of the passenger aircraft 2 and is part of the announcement device 4. In one variant of the example, the entire announcement device 4 is designed as part of the CMS 22 and is therefore integrated into the CMS 22, as indicated by the dashed lines.

The sensor 20b is a sensor of an avionic system 24 of the passenger aircraft 2. The input signals 10b,c are signals of the avionic system 24. The signal 10b, as a signal of the sensor 20b, is a sensor signal, whereas the signal 10c is a different signal, here a processed data signal, from the avionic system, 24.

REFERENCE NUMBER LIST

2 Passenger aircraft
4 Announcement device
6 Memory
8a-c Input
10a-c Input signal
12a-c Information
14 Output
16 Control and evaluation unit
18 On-board loudspeaker
20a-b Sensor
22 CMS
24 Avionic system
P1,2,3, . . . Flight phase
A1,2,3, . . . Announcement
AP Current flight phase
AA Current announcement
Z2 Additional criterion

What is claimed is:

1. An announcement device for a passenger aircraft which passes through different flight phases during a flight, having a memory in which at least one announcement for the passenger aircraft is storable, wherein at least one potential flight phase is assigned to each of the announcements for the output thereof, having a control and evaluation unit with at least one input for a respective input signal which contains information which is correlated with at least one flight phase of the passenger aircraft, having an output to output the announcements, wherein the control and evaluation unit is configured:

to determine a current flight phase on the basis of the input signals, if a current flight phase is determined, to check whether an announcement is contained in the memory, the potential flight phase of which corresponds to the current flight phase, and to identify this announcement as the current announcement, to output the current announcement at the output in the event of a match, and wherein an additional criterion for at least one of the potential flight phases is assigned to at least one of the announcements in the memory and, in the event of a match, the control and evaluation unit is configured to output the announcement only if the additional criterion is additionally satisfied.

2. The announcement device according to claim 1, wherein
the additional criterion contains a time criterion, and the control and evaluation unit is configured to output the announcement in the event of a match at the time which is defined by the time criterion.

3. The announcement device as claimed in claim 1, wherein
the input signal contains the signal from a sensor.

4. The announcement device according to claim 3, wherein
the sensor is a motion sensor and/or pressure sensor and/or a sensor of the avionic system of the passenger aircraft.

5. The announcement device as claimed in claim 3, wherein it contains at least one of the sensors.

6. The announcement device as claimed in claim 3, wherein
the passenger aircraft contains a cabin management system (CMS) and at least one of the sensors is designed as a sensor of the CMS.

7. The announcement device as claimed in claim 1, wherein
the input signal contains a signal from the avionic system of the passenger aircraft.

8. The announcement device as claimed in claim 1, wherein
the passenger aircraft contains a cabin management system (CMS) and at least a part of the announcement device is designed as a submodule for the CMS.

9. A passenger aircraft with an announcement device as claimed in claim 1.

10. The method according to claim 1 for outputting an announcement in a passenger aircraft which passes through different flight phases during a flight, comprising:

providing at least one announcement for the passenger aircraft, wherein at least one potential flight phase is assigned to each of the announcements for the output thereof, providing at least one input signal which contains information which is correlated with at least one flight phase of the passenger aircraft, automatically determining a current flight phase on the basis of the input signals, if a current flight phase is determined, carrying out a check to ascertain whether an announcement is provided, the potential flight phase of which corresponds to the current flight phase, and identifying this announcement as the current announcement, and outputting the current announcement in the passenger aircraft in the event of a match.

11. A method for outputting an announcement in a passenger aircraft which passes through different flight phases during a flight, comprising:

providing at least one announcement for the passenger aircraft, wherein at least one potential flight phase is assigned to each of the announcements for the output thereof, providing at least one input signal which contains information which is correlated with at least one flight phase of the passenger aircraft, automatically determining a current flight phase on the basis of the input signals, if a current flight phase is determined, carrying out a check to ascertain whether an announcement is provided, the potential flight phase of which corresponds to the current flight phase, and identifying this announcement as the current announcement, and outputting the current announcement in the passenger aircraft in the event of a match, and wherein said method is carried out by means of an announcement device according to claim 1.

12. A method for outputting an announcement in a passenger aircraft which passes through different flight phases during a flight, comprising:

providing at least one announcement for the passenger aircraft, wherein at least one potential flight phase is assigned to each of the announcements for the output thereof, providing at least one input signal which contains information which is correlated with at least one flight phase of the passenger aircraft, automatically determining a current flight phase on the basis of the input signals, if a current flight phase is determined, carrying out a check to ascertain whether an announcement is provided, the potential flight phase of which corresponds to the current flight phase, and identifying this announcement as the current announcement, and outputting the current announcement in the passenger aircraft in the event of a match; and wherein said method is carried out in a passenger aircraft according to claim 10.

* * * * *